(12) United States Patent
Kim

(10) Patent No.: US 11,708,895 B1
(45) Date of Patent: Jul. 25, 2023

(54) SHIFT BY WIRE SYSTEM

(71) Applicants: Hyundai Motor Company, Seoul (KR); Kia Corporation, Seoul (KR)

(72) Inventor: Eun Sik Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 41 days.

(21) Appl. No.: 17/947,482

(22) Filed: Sep. 19, 2022

(30) Foreign Application Priority Data

May 2, 2022 (KR) .......................... 1020220054305

(51) Int. Cl.
| | | |
|---|---|---|
| *F16H 59/12* | (2006.01) | |
| *F16H 61/02* | (2006.01) | |
| *F16H 61/22* | (2006.01) | |
| *F16H 61/24* | (2006.01) | |
| *F16H 59/08* | (2006.01) | |

(52) U.S. Cl.
CPC ......... *F16H 59/12* (2013.01); *F16H 61/0213* (2013.01); *F16H 61/22* (2013.01); *F16H 61/24* (2013.01); *F16H 2059/081* (2013.01); *F16H 2059/082* (2013.01); *F16H 2061/248* (2013.01)

(58) Field of Classification Search
CPC ......... F16H 2061/248; F16H 2059/082; F16H 2059/081; F16H 61/24; F16H 61/22; F16H 61/0213; F16H 59/12

USPC ......................................................... 74/473.3
See application file for complete search history.

(56) References Cited

U.S. PATENT DOCUMENTS

| | | | | |
|---|---|---|---|---|
| 2014/0345409 A1* | 11/2014 | Watanabe | ............... | F16H 59/08 |
| | | | | 74/473.3 |
| 2015/0152958 A1* | 6/2015 | Watanabe | ............... | F16H 61/22 |
| | | | | 74/473.12 |
| 2015/0226317 A1* | 8/2015 | Provenza | ............... | G05G 5/005 |
| | | | | 74/473.21 |
| 2018/0244155 A1* | 8/2018 | Keenan | .................... | F16H 59/02 |
| 2021/0317909 A1* | 10/2021 | Ono | ........................ | F16H 59/08 |

FOREIGN PATENT DOCUMENTS

| | | | | | |
|---|---|---|---|---|---|
| DE | 102007029594 A1 | * | 1/2009 | ............. | B60K 37/06 |
| DE | 202016106964 U1 | * | 2/2017 | | |
| DE | 102019208443 A1 | * | 12/2020 | ............. | B60K 37/06 |
| EP | 3217533 A1 | * | 9/2017 | ............. | H02P 6/085 |
| KR | 20210138956 | | 11/2021 | | |

* cited by examiner

*Primary Examiner* — T. Scott Fix
(74) *Attorney, Agent, or Firm* — Fish & Richardson P.C.

(57) ABSTRACT

A shift by wire system is configured to systematically separate a shift dial and an autonomous driving dial, thereby preventing an erroneous manipulation of an autonomous driving mode and allowing effortless selection of the autonomous driving mode. The shift by wire system includes a shift dial shifting to engage a stop gear, a reverse gear, and a forward gear and an autonomous driving dial hidden by the shift dial in the stop gear or reverse gear and exposed from the shift dial in the forward gear to implement the autonomous driving mode.

18 Claims, 15 Drawing Sheets

[REVERSE GEAR (R GEAR)]

[STOP GEAR (N/P GEAR)]

[FORWARD GEAR (D GEAR)]

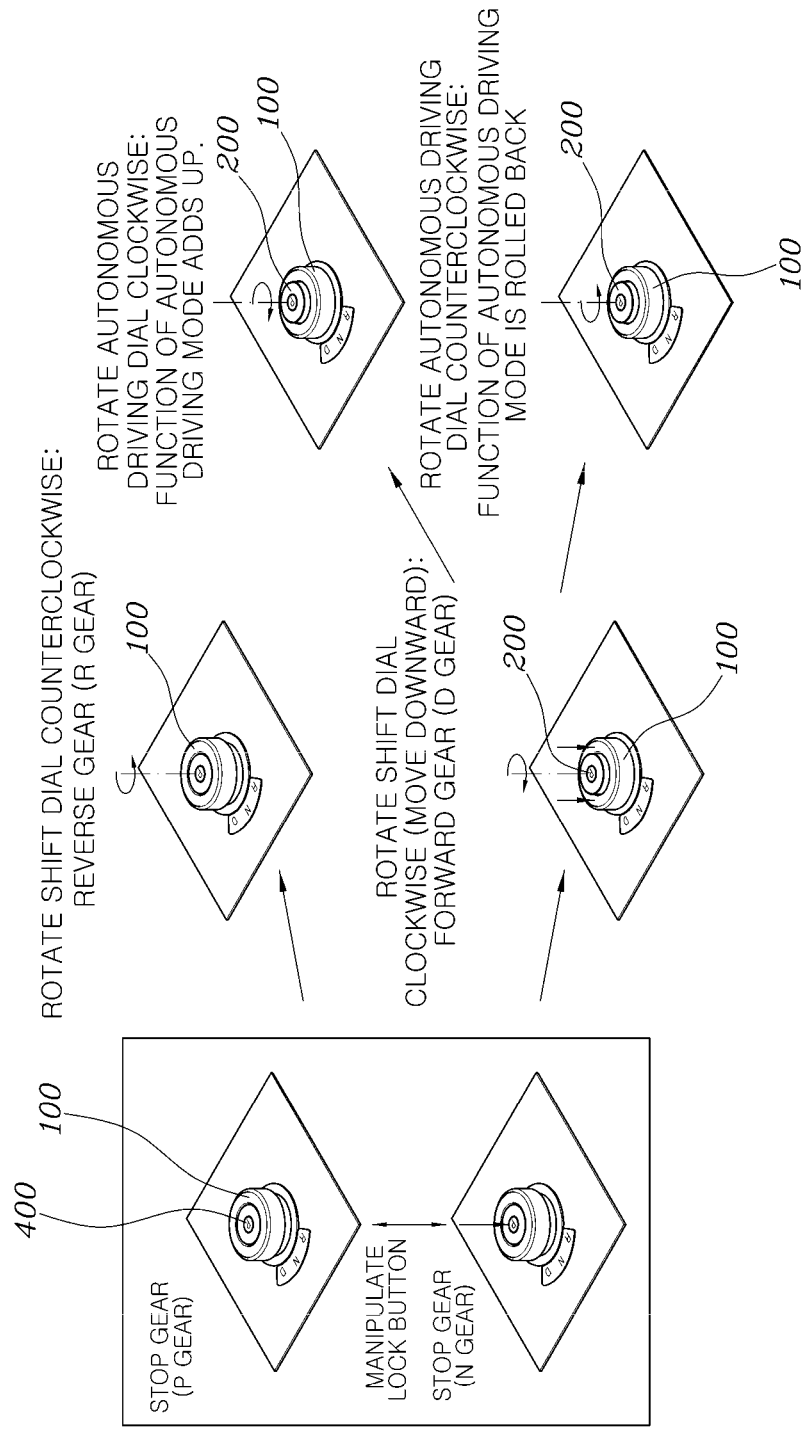

SHIFT BY WIRE SYSTEM

CROSS REFERENCE TO RELATED APPLICATION

The present application claims priority to Korean Patent Application No. 10-2022-0054305, filed on May 2, 2022, the entire contents of which are incorporated herein for all purposes by this reference.

TECHNICAL FIELD

The present disclosure relates to a shift by wire system configured to systematically separate a shift dial and an autonomous driving dial, thereby preventing an erroneous manipulation of the autonomous driving mode and allowing effortless selection of the autonomous driving mode.

BACKGROUND

Technologies for selecting an autonomous driving mode in the shift by wire system have been developed along with the recent developments of autonomous driving technology.

For example, when the autonomous driving mode is selected by a single manipulation in the D gear, the shift mechanism shift to the cruise control mode, and the distance to the front vehicle is automatically adjusted.

When the autonomous driving mode is selected twice in the D gear, the shift mechanism shifts to the autopilot mode (cruise control plus auto steer), and the distance to the vehicle in front is automatically adjusted and the lane change is automatically adjusted as well.

In addition, the function for selecting the autonomous driving mode is placed around the D gear so that switching to the autonomous driving mode is performed in the D gear.

However, selecting the autonomous driving mode in the D gear allows a swift switch to the autonomous driving mode at the cost of the possibility of an erroneous manipulation.

For example, when shifting from the P, R, or N gear to the D gear is performed, there is a possibility of an erroneous manipulation such as an overrun, in which the shift mechanism keeps shifting to the autonomous driving mode position rather than stop in the D gear.

Further, there is a problem that the vehicle may recognize only one manipulation even when the shift mechanism is manipulated twice consecutively in the D gear to shift to the autopilot mode so that the steering function may be erroneously manipulated.

That is, the manipulating speed differs for each person, and when the driver thinks that he/she manipulated twice while the vehicle recognizes only one manipulation, there may be a risk caused by the mismatch.

The matters described as a background of the present disclosure are intended only for a better understanding of the background of the present disclosure and are not to be taken as acknowledgment that they pertain to the conventional art already known to those skilled in the art.

SUMMARY

An object of the present disclosure is to provide a shift by wire system configured to systematically separate a shift dial and an autonomous driving dial, thereby preventing an erroneous manipulation of the autonomous driving mode and allowing an effortless selection of the autonomous driving mode.

In some implementations, the shift by wire system includes a shift mechanism moving in a shifting direction in the process of shifting into a stop gear, a reverse gear, and a forward gear and, when a gear position further changes in a direction different from the shifting direction, separating gears according to a changed position.

The shift mechanism may be a shift dial rotating for shifting. The shift dial may further move linearly along the rotation axis thereof to change positions when the shift dial is rotated for shifting.

The shift dial may linearly move when shifting between the stop or reverse gear and the forward gear is performed The shift dial may not linearly move when shifting between the stop gear and the reverse gear is performed.

The shift dial may be installed in a vehicle interior structure and may linearly move toward the structure when the shift dial is rotated from the stop or reverse gear to the forward gear.

In some implementations, the shift by wire system includes a shift dial shifting to engage a stop gear, a reverse gear, and a forward gear, and an autonomous driving dial hidden by the shift dial in the stop gear or reverse gear and exposed from the shift dial in the forward gear to implement an autonomous driving mode.

When the shift dial is rotated for shifting, the shift dial may move along the rotation axis such that a manipulation portion of the autonomous dial may be hidden by or exposed from the shift dial.

The shift dial may be provided in a vehicle interior structure to surround the manipulation portion of the autonomous driving dial, the manipulation portion of the autonomous driving dial may be entirely hidden by the shift dial in the stop or reverse gear, and the manipulation portion of the autonomous driving dial may be exposed from the shift dial by a linear movement of the shift dial toward the structure in the forward gear.

The shift dial may engage with a detent portion at each gear position such that rotation of the shift dial may be restricted, and the shift dial may be released from the detent portion when the shift dial is pressed down toward the structure at each gear position.

The autonomous driving mode may be activated by the rotation of the autonomous driving dial, and the function of the autonomous driving mode may add up or be rolled back according to the rotating directions.

The autonomous driving dial is provided with a lock button exposed to the outside all the time, a P gear is engaged when shifting to a stop gear is performed, and the stop gear switches to an N gear when the lock button is manipulated in the stop gear.

A main housing that is installed in a vehicle interior structure and into which the shift dial is inserted to be rotatable around the axis and movable toward the structure, a shift dial guide device guiding the shift dial along rotating and moving paths formed for the shift dial, and a shift dial return device providing elastic resilience to the shift dial that linearly moved may be further included.

The shift dial may be provided with a path guide pin serving as the shift dial guide device, the path guide pin may be inserted into a long-holed shift dial groove formed on the rim of the main housing in the circumferential direction, and the path guide pin may move along the shift dial groove to guide the shift dial along the rotating and moving paths.

The shift dial groove may be provided with a detent portion for stopping the shift dial at each gear position.

The detent portion may be formed in a groove shape on the inner surface of the shift dial groove in a direction in which the path guide pin is inserted but in which the shift dial elastically returns.

The shift dial groove may include a first guide section in which the shift dial groove is horizontally formed in the radial direction of the main housing to form a path from the stop gear to the reverse gear and a second guide section in which the shift dial groove inclines toward the structure in the radial direction of the main housing to form a path from the stop gear to the drive gear.

The stop gear may be engaged at the connecting position between the first guide section and the second guide section, the reverse gear may be engaged at an end position of the first guide section, and the drive gear may be engaged at an end position of the second guide section.

An N gear may be engaged at the connecting position between the first guide section and the second guide section, a P gear may be engaged at the end position of the first guide section, the reverse gear may be engaged at the middle position of the first guide section, and the forward gear may be engaged at the end position of the second guide section.

The main housing may be provided with a magnet sensor, and the shift dial may be provided with a shift dial magnet in a region recognizable to the magnet sensor so that the position of the shift dial may be detected.

An autonomous driving dial surrounded by the shift dial and rotated around the axis of the main housing, an autonomous driving dial guide device guiding the autonomous driving dial along a rotating path formed for the autonomous driving dial, and an autonomous driving dial return device providing elastic resilience to the rotated autonomous driving dial may be further included.

The autonomous driving dial may be provided with an axially movable bullet serving as the autonomous driving dial guide device, the bullet may be inserted into a long-holed autonomous driving dial groove formed on the bottom surface of the main housing in the circumferential direction, and the bullet may move along the autonomous driving dial groove to guide the autonomous driving dial along the rotating path.

A bullet return spring pushing the autonomous driving dial and the bullet in the opposite axial directions is provided as the autonomous driving return device, and the autonomous driving dial groove may incline to guide the bullet.

The autonomous driving dial groove may incline downward from either end toward the center.

The function of the autonomous driving mode adds up each time the autonomous driving dial is rotated from the center toward one end of the autonomous driving dial groove, and the function of the autonomous driving mode is rolled back each time the autonomous driving dial is rotated from the center toward the other end of the autonomous driving dial groove.

The main housing may be provided with a magnet sensor, and the autonomous driving dial may be provided with an autonomous driving dial magnet in a region recognizable to the magnet sensor so that the position of the autonomous driving dial may be detected.

In some implementations, the autonomous driving dial is not exposed in all gears except the D gear and the autonomous driving dial is exposed so that the autonomous driving dial may be manipulated, thereby preventing erroneous manipulation of the autonomous driving dial.

In addition, shifting requires a slight pressing of the shift dial toward the console box when manipulating the shift dial, thereby preventing unintended shifting and improving the safety of the shifting.

Further, integration of the shift dial with the autonomous driving dial that allows selection of the autonomous driving mode removes the need to provide a manipulation device of the autonomous driving mode, thereby downsizing the shift device package to allow more freedom in the interior layout and the cost savings.

Further, various functions of the autonomous driving mode may add up or be rolled back based on the concept of (+)/(−) manipulations, thereby facilitating the selection of the autonomous driving mode as the driver desires and enhancing the manipulation convenience of the autonomous driving mode.

BRIEF DESCRIPTION OF THE DRAWINGS

FIG. 13 is a view an example of shift manipulations by a shift dial, an autonomous driving dial, and a lock button.

DETAILED DESCRIPTION

Figure 1:
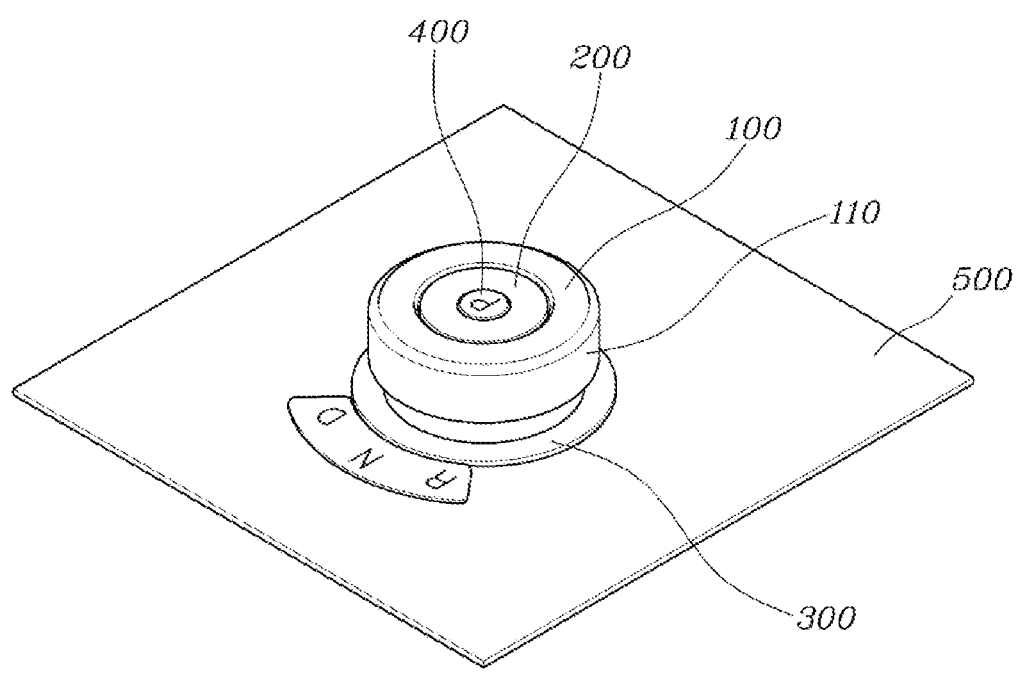
FIG. 1 is a view illustrating an example of an external shape of a shift by wire system.

The implementations disclosed in the present specification will be described with reference to the accompanying drawings in the following, but the same or similar components will be assigned the same reference numerals regardless of the number of drawings, and repetitive descriptions thereof will be omitted.

The suffixes "module" and "portion" for components used in the following description are assigned or used interchangeably in consideration of the ease in the specification writing only and do not have meanings or roles distinct from each other in themselves.

When it is determined that a detailed description of a known technology in the related art may obscure the gist of the present disclosure, the detailed description will be omitted in the description of the present disclosure. Further, the accompanying drawings are only for a better understanding of the implementations disclosed in the present specification. It is to be understood that the technical spirit disclosed in the present specification is not limited by the accompanying drawings and that the present disclosure encompasses all modifications, equivalents, and substitutes included in the spirit and technical scope of the present disclosure.

Terms including ordinal numbers such as first, second, and the like may be used to describe various components, but the components are not to be limited by the terms. The terms may only be used for the purpose of distinguishing one component from another.

When a component is referred to as being "connected" or "coupled" to another component, the component may be directly connected or coupled to the another component, but it is to be understood that other components may exist in between. On the other hand, when a component is referred to as being "directly connected" or "directly coupled" to another component, it is to be understood that there are no intervening components present.

Singular expressions include plural expressions unless the context explicitly indicates otherwise.

In the present specification, terms such as "comprise" or "have" are intended to designate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof in advance.

A controller may include a communication device for communicating with other controllers or sensors to control functions the controller is in charge of, a memory for storing an operating system or logic commands and input/output information, and one or more processors executing judgment, calculation, determination, and the like necessary for controlling the functions the controller is in charge of.

Preferred implementations of the present disclosure will be described in detail with reference to the accompanying drawings.

Figure 2:
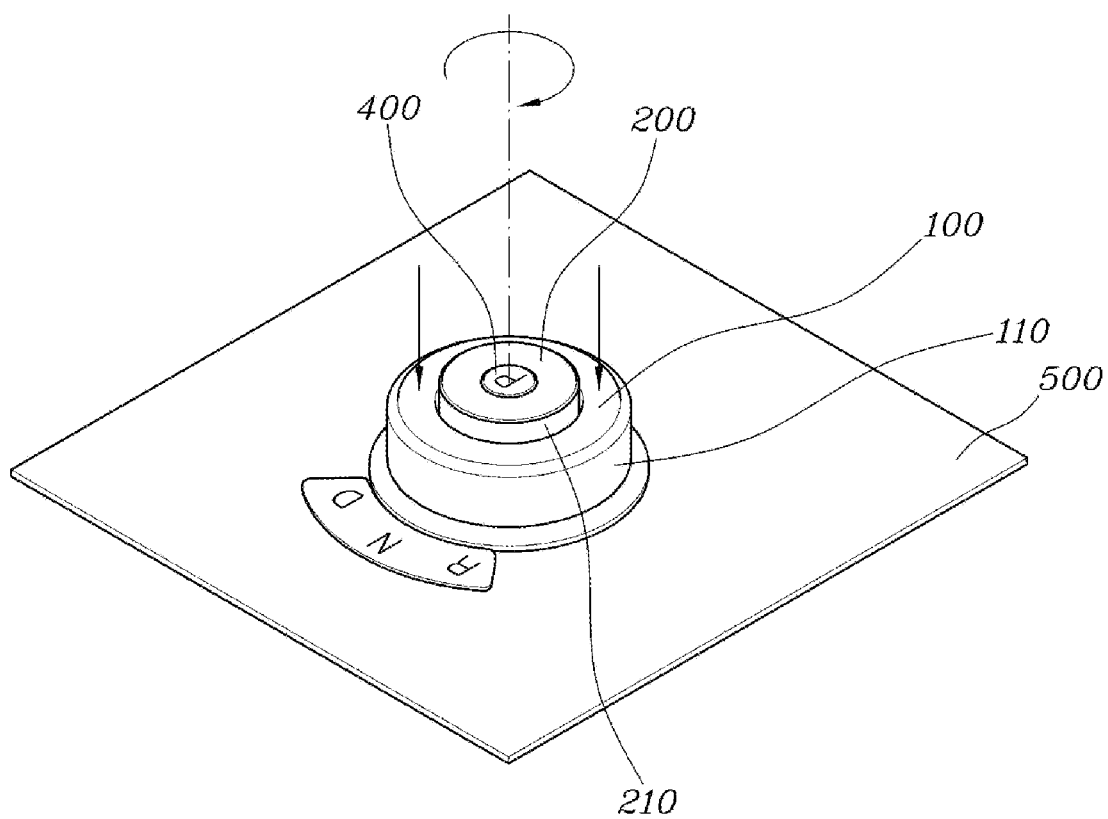
FIG. 2 is a view illustrating an example of an engagement of a forward gear in a shift by wire system.

FIG. 1 is a view illustrating an external shape of a shift by wire system, and FIG. 2 is a view illustrating an engagement of a forward gear in the shift by wire system.

FIG. 1 shows that the shift by wire system includes a shift mechanism moving in a shifting direction in the process of shifting into a stop gear, a reverse gear, and a forward gear and, when the gear position further changes in a direction different from the shifting direction, separating gears according to a changed position.

That is, when the driver performs a sifting on the shift mechanism, the shift mechanism moves in the manipulating direction by the driver to engage a gear intended by the driver.

Simultaneously, the shift mechanism further moves in a direction other than the manipulation direction of the shift mechanism in the manipulation process of the shift mechanism.

For example, the stop gear includes N and P gears, the reverse gear is the R gear, the forward gear is the D gear, and the shift mechanism further moves when shifting from the P gear (or N gear) to the D gear is performed so that the mere change of the shift position may separate the P gear from the D gear.

And the shift mechanism may be configured not to move when shifting from the P gear (or N gear) to the R gear is performed or configured to further move when shifting from the P gear to the R gear is performed so that the mere change of the shift mechanism position may separate the P gear from the R gear.

A shift dial 100 may be employed as an example of a shift mechanism.

FIGS. 1 and 2 show that the shift mechanism is the shift dial 100 rotating for shifting, and the shift dial 100 may further move linearly along the rotation axis thereof to change the positions when the shift dial 100 is rotated for shifting.

That is, when the driver rotates the shift dial 100 for shifting, the shift dial 100 rotates in the rotating direction by the driver to engage a gear intended by the driver.

In addition, the shift dial 100 further moves linearly along the rotation axis in the process of rotating the shift dial 100.

The further movement of the shift dial 100 according to the gears facilitates the separation of the current shift.

In addition, in some implementations, the shift dial 100 may linearly move when the shifting between the stop or reverse gear and the drive gear is performed.

That is, the shift dial 100 linearly moves along the rotation axis when shifting from the P gear (or N gear) to the D gear is performed so that the mere linear movement of the shift dial 100 allows separation between the P gear and the D gear.

However, the shift dial 100 may not linearly move when shifting between the stop gear and the reverse gear is performed.

That is, absence of movement of the shift dial 100 along the rotation axis when shifting from the P gear (or N gear) to the R gear is performed allows separation between the D gear and other gears.

In addition, in some implementations, the shift dial 100 may be installed in the vehicle interior structure, and the shift dial 100 may linearly move toward the structure when the shift dial 100 is rotated from the stop or reverse gear to the forward gear.

For example, the shift dial is installed in a console box 500 positioned next to a driver's seat. Accordingly, the shift dial 100 moves downward to the inside of the console box 500 when the shift dial 100 shifts to the D gear.

On the other hand, in some implementations, the shift device includes the shift dial 100 for shifting and the autonomous driving dial 200 for autonomous driving mode manipulation.

FIGS. 1 and 2 show that the shift device includes the shift dial 100 shifting to engage a stop gear, a reverse gear, and a forward gear, and the autonomous driving dial 200 hidden by the shift dial 100 in the stop gear or reverse gear and exposed from the shift dial 100 in the drive gear to implement the autonomous driving mode.

That is, the shift dial 100 is manipulated to engage the P gear, N gear, R gear, and D gear, and the autonomous driving dial 200 is manipulated to activate the autonomous driving mode.

However, the manipulation portion 210 of the autonomous driving dial 200 is hidden by the shift dial 100 in the P gear, N gear, and R gear such that the autonomous driving dial 200 may not be manipulated, and the manipulation portion 210 of the autonomous driving dial 200 is not hidden by the shift dial 100 in the D gear such that the manipulation portion 210 of the autonomous driving dial 200 is exposed so that the autonomous driving dial 200 may be manipulated.

Accordingly, the autonomous driving dial 200 may be manipulated only in the D gear, thereby preventing an erroneous manipulation of the autonomous driving mode.

Further, when the shift dial 100 is rotated for shifting, the shift dial 100 may move along the rotation axis thereof such that the manipulation portion 210 of the autonomous driving dial 200 may be hidden or exposed.

For example, when the shift dial 100 is rotated to shift from the P gear (or N gear) to the D gear, the shift dial 100 linearly moves along the rotation axis to one side such that the manipulation portion 210 of the autonomous driving dial 200 is exposed to the outside.

When the shift dial 100 is rotated to shift to D gear from P gear, the shift dial 100 linearly moves along the rotation axis to the other side such that the manipulation portion 210 of the autonomous driving dial 200 is hidden.

In some implementations, the shift dial 100 is provided in the vehicle interior structure to surround the manipulation portion 210 of the autonomous driving dial 200, that the manipulation portion 210 of the autonomous driving dial 200 is entirely hidden by the shift dial 100 in the stop or reverse gear, and that the manipulation portion 210 of the autonomous driving dial 200 may be exposed from the shift dial 100 by a linear movement of the shift dial 100 toward the structure in the forward gear.

Specifically, the shift dial 100 is formed in a cylindrical donut shape, and the autonomous driving dial 200 is inserted into the shift dial 100 with the outer circumferential surface of the autonomous driving dial 200 facing the inner circumferential surface of the shift dial 100.

Both the shift dial 100 and the autonomous driving dial 200 are manipulated by rotating around the rotation axis. The rim of the shift dial 100 becomes the manipulation portion 110 of the shift dial 100, and the rim of the autonomous driving dial 200 becomes the manipulation portion 210 of the autonomous driving dial 200.

In particular, the top of the shift dial 100 is to be as high as or higher than the top of the autonomous driving dial 200 in the stop and reverse gears, and the top of the shift dial 100 is to be lower than the top of the autonomous driving dial 200 in the forward gear.

Accordingly, when the shift dial 100 is rotated from the P gear (or N gear) to the D gear, the shift dial 100 moves downward toward the console box 500 such that the manipulation portion 210 on the rim of the autonomous driving dial 200 is exposed to the outside so that the autonomous driving dial 200 may be manipulated.

In contrast, when the shift dial 100 is rotated from the D gear to the P gear, the shift dial 100 moves upward such that the manipulation portion 210 on the rim of the autonomous driving dial 200 is entirely hidden by the shift dial 100 so that the autonomous driving dial 200 may not be manipulated.

On the other hand, in some implementations, the shift dial 100 engages with a detent portion 350 at each gear position such that manipulation is restricted, and the shift dial 100 is released from the detent portion 3350 when the shift dial 100 is pressed down toward the structure at each gear position.

That is, when the shift dial 100 is pressed down toward the console box 500 at the P gear (or N gear), R gear, and D gear positions, the shift dial 100 is released from the detent portion 350 such that shifting to another gear becomes possible.

And, once the intended gear is engaged, the shift dial 100 engages with the detent portion 350 and a further shift to another gear is restricted as long as the shift dial 100 is not pressed down.

The driver needs to press the shift dial 100 for shifting before manipulation allows shifting, thereby ensuring safety in the shifting.

It is to be noted that the configuration of the detent portion 350 will be described below.

On the other hand, in some implementations, the autonomous driving mode is activated by the rotation of the autonomous driving dial 200, and the function of the autonomous driving mode adds up or is rolled back according to the rotating directions.

For example, when the vehicle drives in the autonomous driving mode, the autonomous driving dial 200 may be manipulated in the direction of expanding or in the direction of rolling back various functions that may be performed during autonomous driving.

Accordingly, the preset function of autonomous driving mode adds up when the autonomous driving dial 200 is rotated in the forward direction, and the preset function of autonomous driving is rolled back when the autonomous driving dial 200 is rotated in the reverse direction.

The autonomous driving mode function may be set to add up or be rolled back incrementally at each rotation of the autonomous driving dial 200 in the same direction.

On the other hand, in some implementations, the autonomous driving dial 200 is provided with a lock button 400 exposed to the outside all the time. The P gear is engaged when shifting to the stop gear is performed, and the P gear switches to the N gear when the lock button 400 is manipulated in the stop gear.

For example, the lock button 400 is provided in the center of the upper surface of the autonomous driving dial 200, and the lock button 400 may have a form of a thin electronic button switch.

The P gear is engaged when shifting from the reverse or forward gear to the stop gear is performed. When the lock button 400 is manipulated in the P gear, the N gear is engaged, and when the lock button 400 is manipulated in the N gear, the P gear is engaged again.

It is to be noted that the vehicle may be started only in the stop gear.

Figure 3:
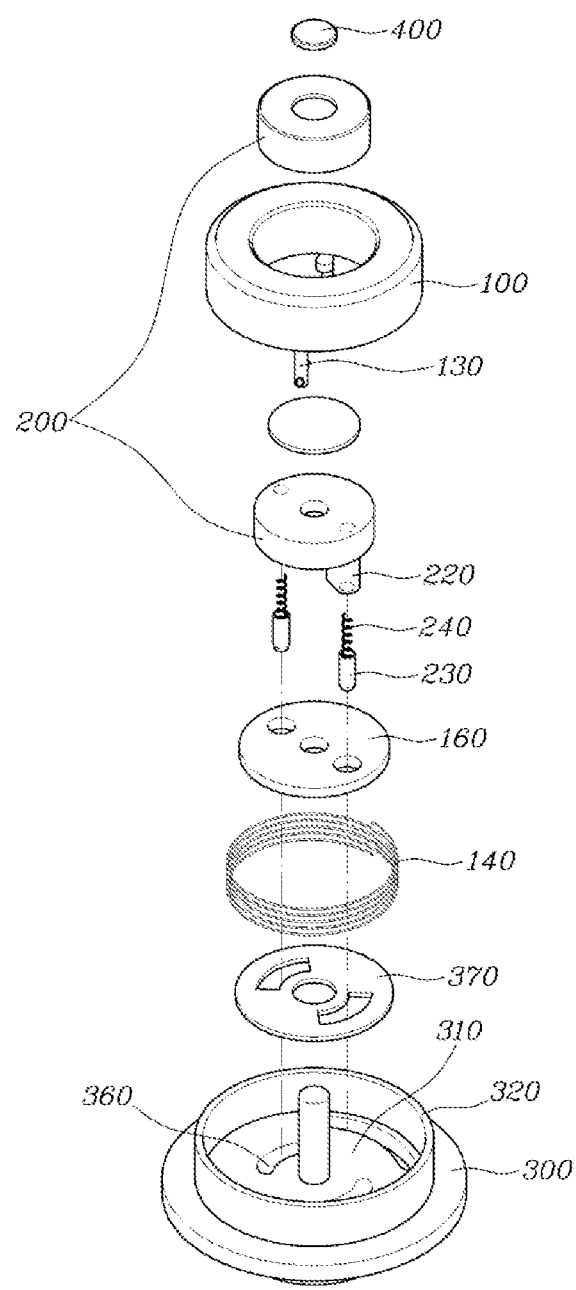
FIG. 3 is an exploded view illustrating an example of a shift by wire system.
Figure 4:
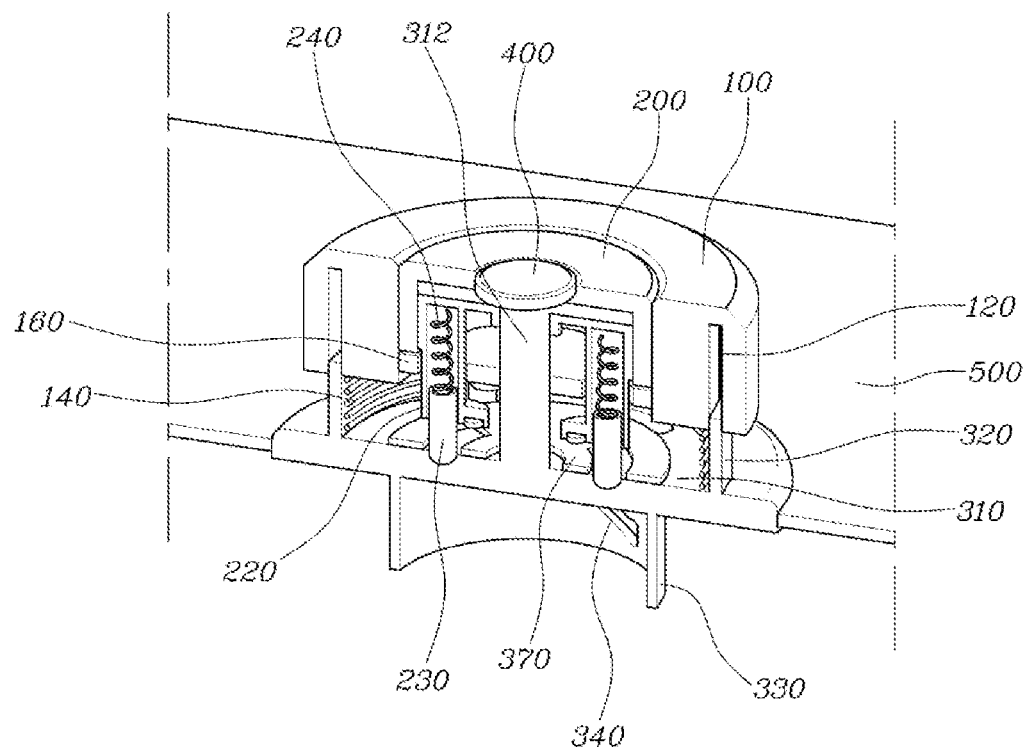
FIGS. 4 and 5 are cross-sectional views showing an example of a shift by wire system.
Figure 5:
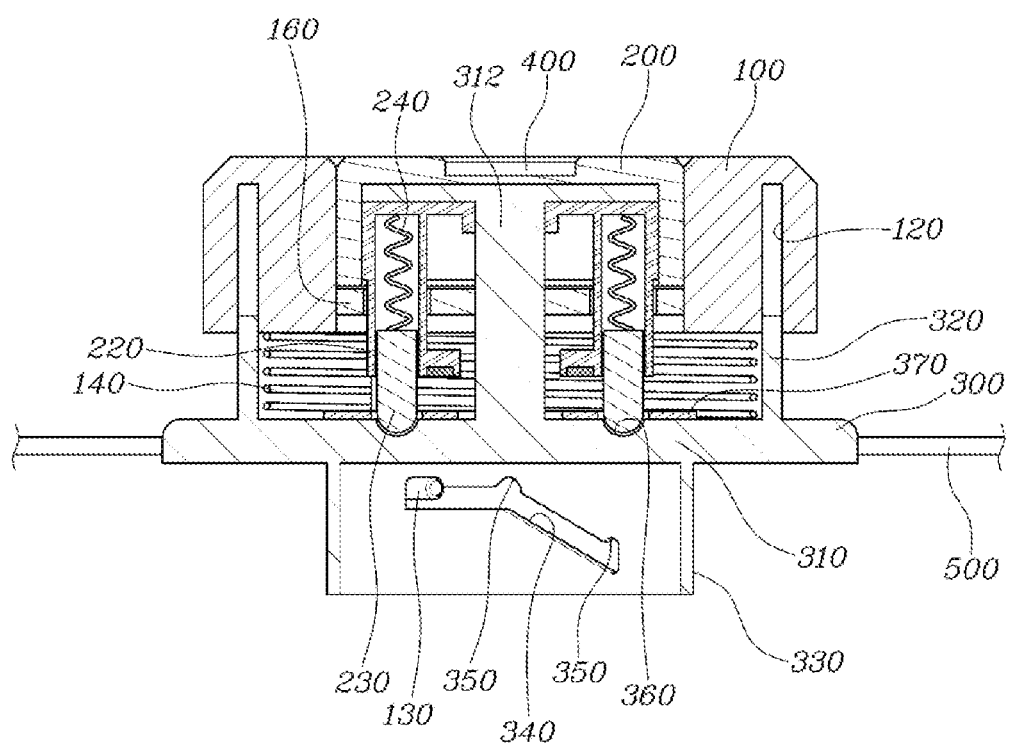

FIG. 3 is an exploded view of the shift by wire system, and FIGS. 4 and 5 are cross-sectional views of the shift by wire system. In some implementations, the shift dial 100 is installed in the main housing 300, and the shifting is made possible through the shift dial guide device and the shift dial return device.

The drawings show that a main housing 300 that is installed in a vehicle interior structure and into which the shift dial 100 is inserted to be rotatable around the axis and movable toward the structure, a shift dial guide device guiding the shift dial 100 along rotating and moving paths formed for the shift dial 100, and a shift dial return device providing elastic resilience to the shift dial 100 that linearly moved may be further included.

Specifically, a disc-shaped support portion 310 is formed in the middle of the main housing 300, and the support portion 310 is fixed to the console box 500.

The upper surface of the support portion 310 is provided with a cylindrical insertion protrusion portion 320 having an open upper portion and the bottom surface of the shift dial 100 is provided with a circular insertion groove portion 120 at a position corresponding to the insertion protrusion portion 320, wherein the insertion protrusion portion 320 is inserted into the insertion groove portion 120 such that the shift dial 100 is inserted rotatably and vertically movably on top of the main housing 300.

A lower surface of the support portion 310 is provided with a cylindrical guide protrusion 330 having an open lower portion, and a part of the shift dial 100 is inserted into the guide protrusion portion 3303 to guide the shift dial 100 along the rotation and moving paths.

A shift dial return spring 140 is supported by the upper surface of the support portion 310 of the main housing 300 and the bottom surface of the shift dial 100 facing the upper surface of the support portion 310 so that the shift dial 100 is provided with an upward elastic resilience. The shift dial return spring 140 is a tension spring. A lower end of the sift dial return spring 140 is supported by the support portion 310 and an upper end of the shift dial return spring 140 is supported by the shift dial 100.

Figure 6:
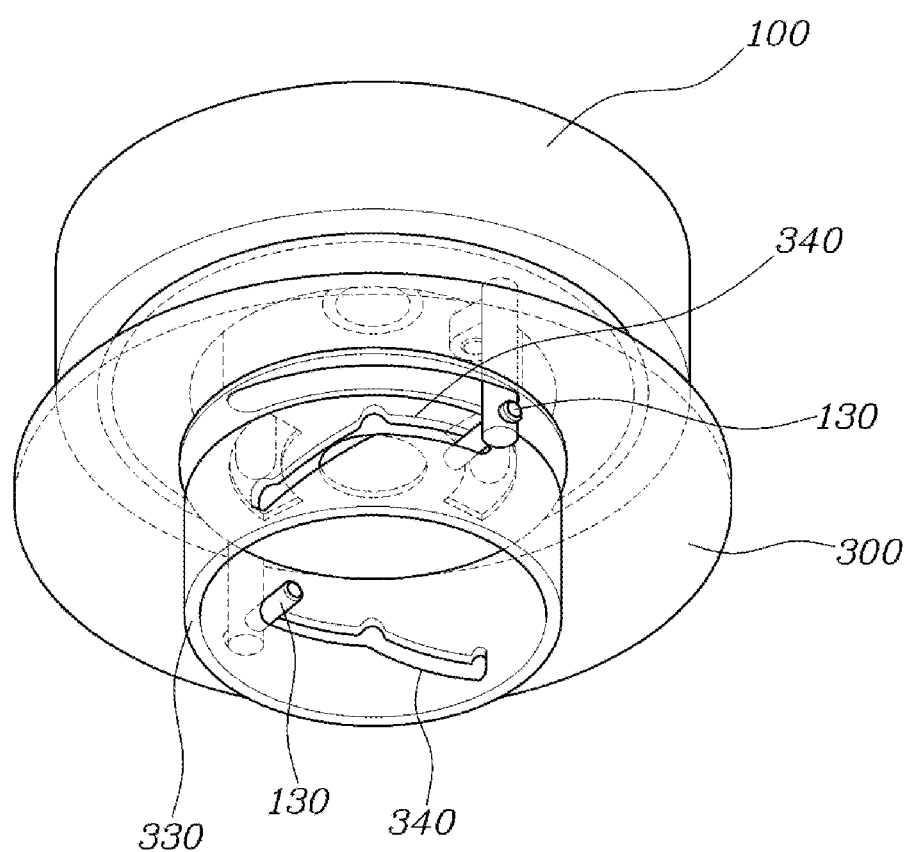
FIG. 6 is a view illustrating an example of a shift by wire system viewed from below.

Further, FIGS. 3 and 6 show that the shift dial 100 is provided with a path guide pin 130 serving as the shift dial guide device, the path guide pin 130 is inserted into a long-holed shift dial groove 340 formed on the rim of the main housing 300 in the circumferential direction, and the path guide pin 130 moves along the shift dial groove 340 to guide the shift dial 100 along the rotating and moving paths.

Specifically, the path guide pin 130 is formed in an L-shape, the upper end of the path guide pin 130 is fixed to the bottom surface of the shift dial 100, and the path guide pin 130 faces the guide protrusion portion 330 of the main housing 300 through the support portion 310. The support portion 310 may be provided with an arc-shaped grove along the rotating path of the path guide pin 130.

The shift dial groove 340 is formed in the circumferential direction of the guide protrusion portion 330, and the lower end of the path guide pin 130 is inserted into the shift dial groove 340. The main housing 300 may be provided with a respective pair of the shift dial grooves 340 and the path guide pins 130 at intervals of 180°.

Accordingly, when the shift dial 100 is rotated, the path guide pin 130 moves along the shift dial groove 340, thereby guiding the shift dial 100 along the rotating and moving paths.

In addition, as illustrated in FIG. 5, the shift dial groove 340 may be provided with a detent portion 350 for stopping the shift dial 100 at each gear position.

Specifically, the detent portion 350 is formed in a groove shape on the inner surface of the shift dial groove 340 in a direction in which the path guide pin 130 is inserted but the shift dial 100 elastically returns.

For example, the detent portion 350 is partially formed along the inner surface of the shift dial groove 340. The detent portion 350 is formed in a hemispheric shape corresponding to the outer diameter of the path guide pin 130 at the upper end of the inner surface of the shift dial groove 340.

Accordingly, the path guide pin 130 remains inserted into the detent portion 350 by the elastic resilience of the shift dial return spring 140, thereby forming a sense of shifting orderliness while engaging respective gears at the detent portion 350 position.

Figure 7A:
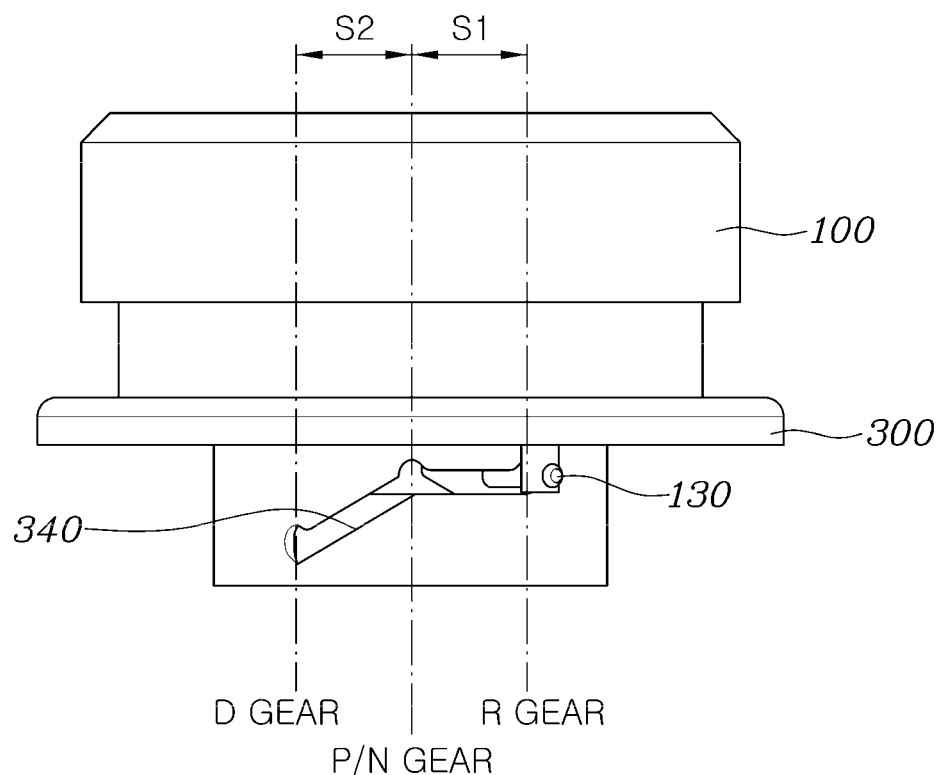
FIGS. 7A, 7B, and 7C are views for describing configurations in which a shift by wire system is manipulated to engage stop, reverse, and forward gears.
Figure 7B:
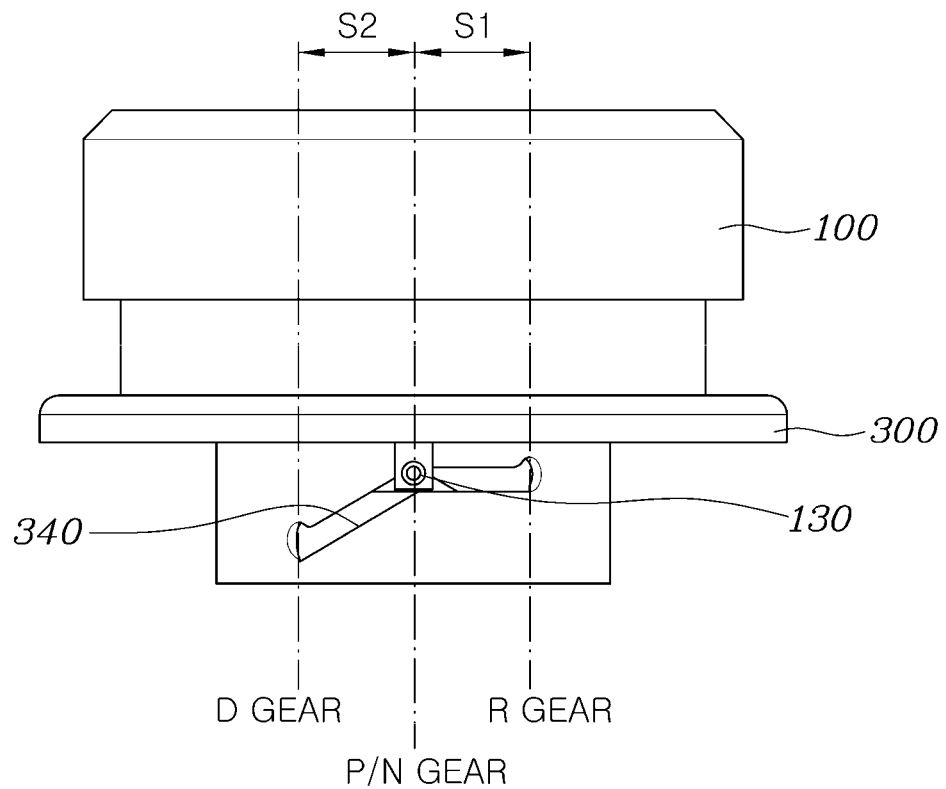
Figure 7C:
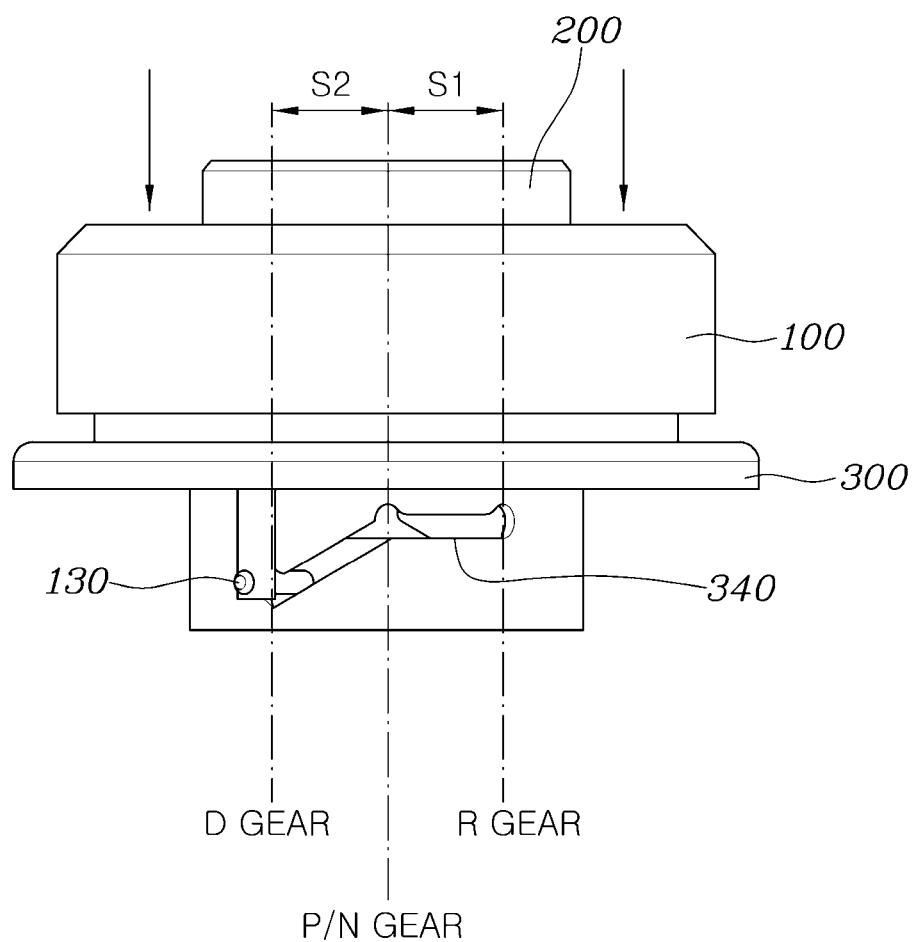

Further, as illustrated in FIGS. 7A, 7B, and 7C, the shift dial groove 340 may include a first guide section S1 in which the shift dial groove 340 is horizontally formed in the radial direction of the main housing 300 to form a path from the stop gear to the reverse gear and a second guide section S2 in which the shift dial groove 340 inclines toward the structure in the radial direction of the main housing 300 to form a path from the stop gear to the drive gear.

That is, since the shift dial groove 340 is horizontally formed in the first guide section S1, the path guide pin 130 moves along the horizontal first guide section S1 when shifting the shift dial 100 from the P gear (or N gear) to the R gear is performed so that the shift dial 100 rotates in the shifting direction only.

In contrast, since the shift dial groove 340 inclines in the second guide section S2, the path guide pin 130 moves along the inclining second guide section S2 when shifting the shift dial 100 from the P gear to the D gear is performed so that the shift dial 100 rotates in the shifting direction and moves downward toward the console box 500 simultaneously.

Accordingly, the shift dial 100 hides the manipulation portion 210 on the rim of the autonomous driving dial 200 in the stop gear and the reverse gear so that the autonomous driving dial 200 may not be manipulated, and the manipulation portion 210 of the autonomous driving dial 200 is exposed from the shift dial 100 in the forward gear so that the autonomous driving dial 200 may be manipulated in the forward gear only.

In addition, in some implementations, the stop gear may be engaged at the connecting position between the first guide section S1 and the second guide section S2, the reverse gear may be engaged at an end position of the first guide section S1, and the forward gear may be engaged at an end position of the second guide section S2.

That is, the detent portion 350 is formed in a middle portion where the first guide section S1 and the second guide section S2 are connected to engage the P gear and the N gear, the detent portion 350 is formed at the end of the first guide section S1 to engage the R gear, and the detent portion 350 is formed at the end of the second guide section S2 to engage the D gear.

In addition, in some implementations, the P gear and the N gear may be engaged at the same position and the main housing 300 may be restructured to physically separate the P gear and the N gear.

Figure 8:
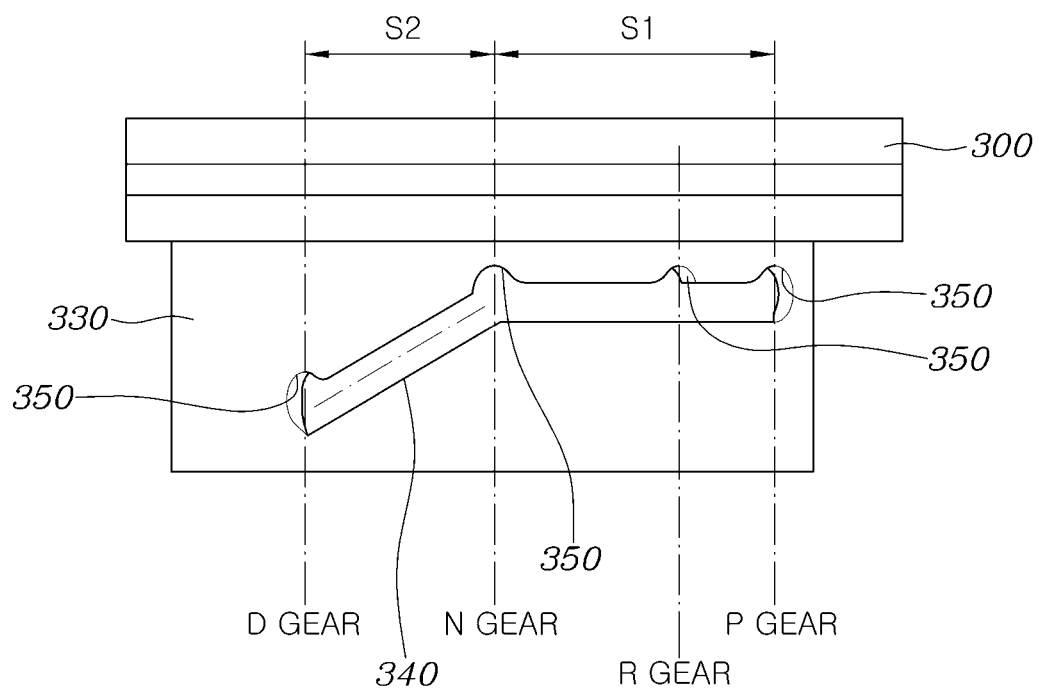
FIG. 8 is a view illustrating an example of a main housing with N and P gears physically separated.

FIG. 8 shows that the N gear may be engaged at the connecting position between the first and second guide sections, the P gear may be engaged at the end position of the first guide section, the reverse gear may be engaged in the middle position of the first guide section, and the forward gear may be engaged at the end position of the second guide section.

That is, the detent portion 350 is formed in the middle portion where the first guide section S1 and the second guide section S2 are connected to engage the N gear, the detent portion 350 is formed at the end of the first guide section S1 to engage the P gear, and the detent portion 350 is formed at the end of the second guide section S2 to engage the D gear.

The detent portion 350 is formed in the horizontal middle portion of the first guide section S1 to engage the R gear.

In this case, the engagement positions of the P gear and the N gear are independently implemented so that the lock button 400 may be eliminated. In addition, four gear positions are fixedly formed in order of P-R-N-D so that shifting may be performed just as by the conventional mechanical lever method.

On the other hand, in some implementations, the position of the shift dial 100 may be detected using a magnet.

Figure 9:
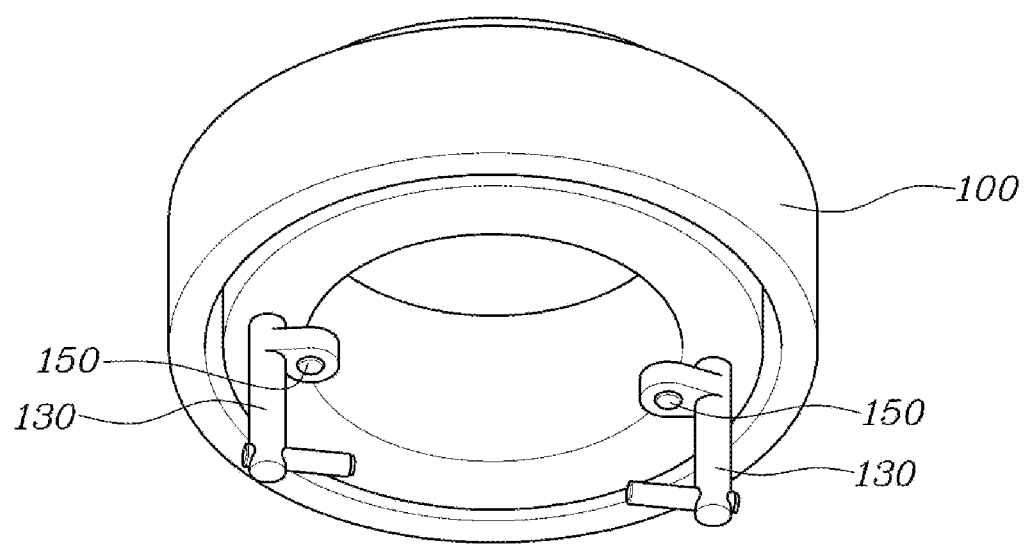
FIG. 9 is a view illustrating an example of a shift dial viewed from below.
Figure 10:
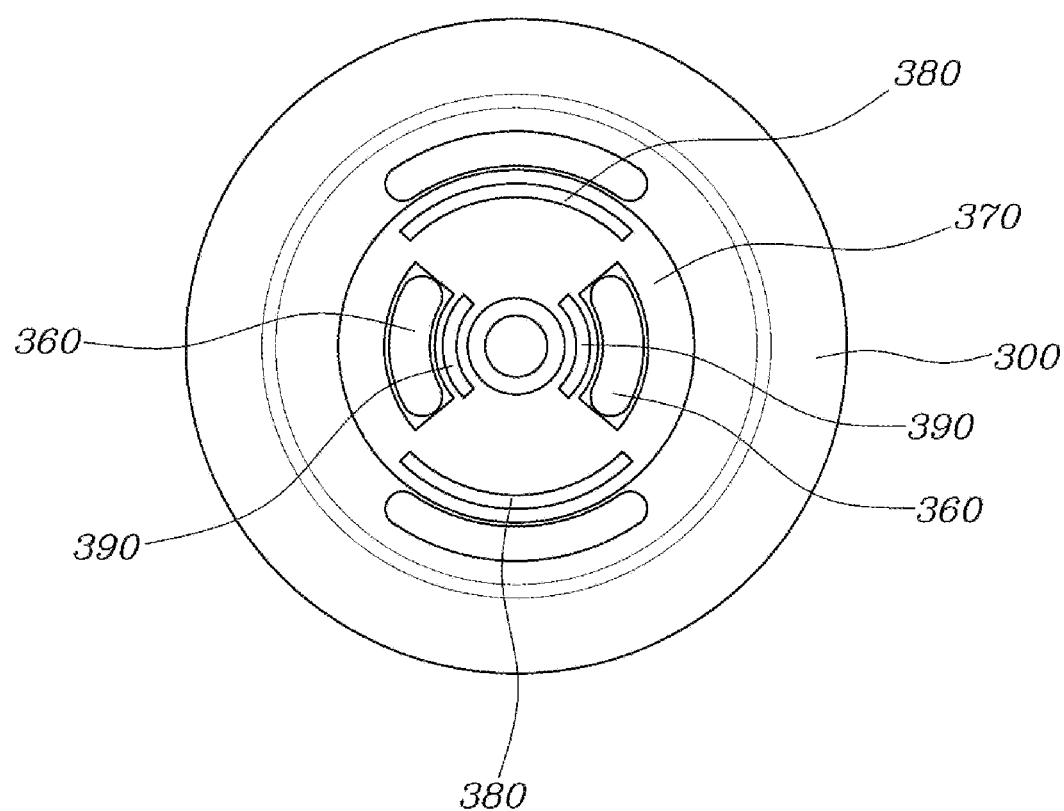
FIG. 10 is a view illustrating an example of a coupling state of a PCB to the main housing.

FIGS. 5, 9, and 10 show that the main housing 300 is provided with a magnet sensor 380 and that the shift dial 100 is provided with a shift dial magnet 150 in a region recognizable to the magnet sensor 380 so that the position of the shift dial 100 may be detected.

Specifically, the upper ends of the path guide pins 130 on either side may be provided with the shift dial magnets 150. The PCB 370 is coupled to the upper surface of the support portion 310 of the main housing 300, and the PCB 370 is provided with a magnet sensor 380 in a region recognizable to the shift dial magnet 150. The PCB 370 may be connected to a controller of the vehicle.

Accordingly, when the shift dial magnet 150 moves together with the shift dial 100 as the shift dial 100 rotates and moves, the magnet sensor 380 may recognize the movement of the shift dial magnet 150 to detect the current position of the shift dial 100.

On the other hand, in some implementations, the autonomous driving dial 200 may be installed in the shift dial, 100 and the autonomous driving mode may be manipulated through an autonomous driving dial guide device and an autonomous driving dial return device.

FIGS. 3 to 5 show that the autonomous driving dial 200 surrounded by the shift dial 100 and rotated around the axis of the main housing 300, an autonomous driving dial guide device guiding the autonomous driving dial 200 along the rotating path formed for the autonomous driving dial 200, and an autonomous driving dial return device providing elastic resilience to the rotated autonomous driving dial 200 may be further included.

Specifically, a T-shaped support column 312 is formed in the center of the upper surface of the main housing 300, and the autonomous driving dial 200 is rotatably provided on top of the support column 312 while being inserted into a space formed in the center of the shift dial 100.

A plate-shaped departure prevention member 160 is fixed to an inner surface of the center space of the shift dial 100 and the autonomous driving dial 200 is placed on the upper surface of the departure prevention member 160, thereby preventing the shift dial 100 from departing from the main housing 300.

The upper surface of the support portion 310 is provided with an autonomous driving dial groove 360, the autonomous driving dial 200 is provided with a bullet 230 to be described below, and the bullet 230 is inserted into the autonomous driving dial groove 360 to guide the autonomous driving dial 200 along the rotating path.

Further, the bullet 230 rotating together with the autonomous driving dial 200 is provided with the elastic resilience by the autonomous driving dial return device so that the autonomous driving dial 200 returns to the pre-rotated state.

Further, the autonomous driving dial 200 is provided with an axially movable bullet 230 serving as the autonomous driving dial guide device, the bullet 230 is inserted into a long-holed autonomous driving dial groove 360 formed on the bottom surface of the main housing 300 in the circumferential direction, and the bullet 230 moves along the autonomous driving dial groove 360 to guide the autonomous driving dial 200 along the rotating path.

Specifically, a bullet guide 220 protrudes from the bottom of the autonomous driving dial 200 in a tubular shape with an open lower portion, a lower end of the bullet is inserted into the bullet guide 220 to be exposed from the lower portion of the bullet guide 220, and the bullet 230 assumes the shape of a bullet and linearly moves up and down in the bullet guide 220.

The upper surface of the support portion 310 is provided with the autonomous driving dial groove 360 along the rotating path of the bullet 230, and the lower end of the bullet 230 is inserted into the autonomous driving dial groove 360.

The PCB 370 is fixed to the upper surface of the support portion 310 at this time, and the PCB 370 is provided with a groove having a shape corresponding to the autonomous driving dial groove 360 such that the bullet may be inserted into the autonomous driving dial groove 360 through the PCB 370.

Accordingly, when the autonomous driving dial 200 is rotated, the bullet 230 moves along the autonomous driving dial groove 360 to guide the autonomous driving dial 200 along the rotating path.

The autonomous driving return device is provided with a bullet return spring 240 pushing the autonomous driving dial 200 and the bullet 230 in the opposite axial directions, and the autonomous driving dial groove 360 inclines to guide the bullet 230.

Specifically, the bullet return spring 240 is provided inside the bullet guide 220 to provide the bullet 230 with downward elastic resilience. That is, the bullet return spring 240 is a tension spring. The upper end of the bullet return spring 240 is supported by the inner ceiling surface of the bullet guide 220, and the lower end of the bullet return spring 240 is supported by the upper end of the bullet 230.

In particular, the autonomous driving dial groove 360 inclines with respect to the planar support portion 310.

That is, when the driver rotates the autonomous driving dial 200 while the bullet 230 is positioned in a downwardly inclining portion of the autonomous driving dial groove 360, the bullet 230 moves upward along the autonomous driving dial groove 360.

When the driver releases the rotation force of the autonomous driving dial 200 in this state, a force is performed to push the bullet 230 downward by the spring force of the bullet return spring 240 so that the bullet 230 moves downward while rotating along the inclining autonomous driving dial groove 360.

Accordingly, a sense of orderliness is formed by the rotation of the autonomous driving dial 200.

Figure 11:
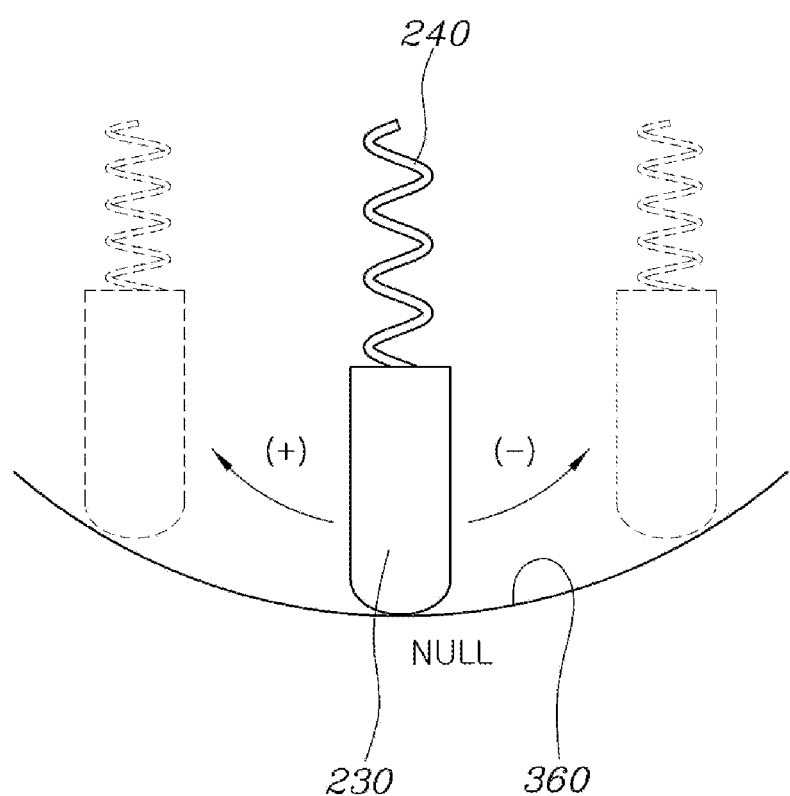
FIG. 11 is a view for describing an example configuration in which an autonomous driving dial is manipulated to change autonomous driving modes.

Further, as illustrated in FIG. 11, the autonomous driving dial grooves 360 may incline downward from either end toward the center.

In some implementations, the autonomous driving dial grooves 360 may face each other across the center.

That is, the bullet 230 is positioned at the center of the autonomous driving dial groove 360 to engage a NULL gear when the autonomous driving dial 200 is not manipulated.

When the autonomous driving dial 200 is rotated in the forward direction while the NULL gear is engaged, (+) direction setting that causes the functions of the autonomous driving mode to add up is possible, and when the autonomous driving dial 200 is rotated in the backward direction, (−) direction setting that rolls back the functions of the autonomous driving mode is possible.

Of course, the bullet 230 moves along the inclining autonomous driving dial groove 360, and the autonomous driving dial 200 returns to the NULL gear after the autonomous driving dial 200 is rotated forward and backward.

Further, the function of the autonomous driving mode adds up each time the autonomous driving dial 200 is rotated from the center toward one end of the autonomous driving dial groove 360, and the function of the autonomous driving mode is rolled back each time the autonomous driving dial 200 is rotated from the center toward the other end of the autonomous driving dial groove 360.

For example, the functions implemented in the autonomous driving mode may be set to add up or be rolled back in the following steps.

Step 1: cruise control (in-lane driving) function
Step 2: cruise control+lane change function
Step 3: cruise control+lane change+U-turn function
Step 4: cruise control+lane change+U-turn+autonomous driving function Another example is the level of the autonomous driving mode set to increase or decrease in the following steps.

Step 0: no automation
Step 1: driver assistance
Step 2: partial automation
Step 3: conditional automation
Step 4: advanced automation
Step 5: full automation Still another example is the distance to a front vehicle by the cruise control set to increase or decrease in the following steps.
Step 1: 100 m
Step 2: 90 m
Step 3: 80 m
Step 4: 70 m
Step 5: 60 m Still another example is the maximum vehicle speed in the autonomous driving mode set to increase or decrease in the following steps.
Step 1: 30 km/h
Step 2: 50 km/h
Step 3: 80 km/h
Step 4: 100 km/h
Step 5: 150 km/h The figures presented above for each function are mere examples, subject to change at the time of setting.

On the other hand, in some implementations, the position of the autonomous driving dial 200 may be detected using a magnet.

Figure 12:
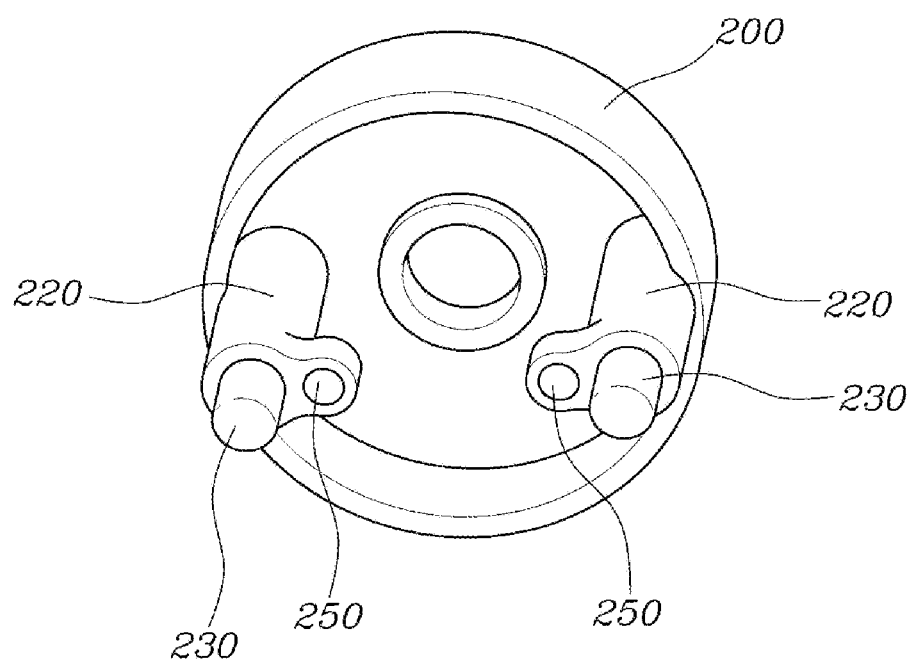
FIG. 12 is a view illustrating an example of a lower shape of an autonomous driving dial.

FIGS. 9, 10, and 12 show that the main housing 300 is provided with a magnet sensor 390 and that the autonomous driving dial 200 is provided with an autonomous driving dial magnet 250 in a region recognizable to the magnet sensor 390 so that the position of the autonomous driving dial 200 may be detected.

Specifically, the lower end of the bullet guide 220 on either side is provided with the autonomous driving dial magnet 250. The PCB 370 is provided with a magnet sensor 390 in a region recognizable to the autonomous driving dial magnet 250.

Accordingly, when the autonomous driving dial magnet 250 moves as the autonomous driving dial 200 is rotated, the magnet sensor 390 recognizes the movement of the autonomous driving dial magnet 250 and detects the current position of the autonomous driving dial 200.

FIG. 13 is a view exemplifying shifting by the shift dial 100, the autonomous driving dial 200, and the lock button 400.

FIG. 13 describes a shifting process using the shift by wire system. Pressing the lock button 400 in the P gear shifts the gear to the N gear, and pressing the lock button 400 in the N gear returns the shift to the P gear.

When the shift dial 100 is rotated counterclockwise in the P gear or the N gear to engage the reverse gear, the shift dial 100 shifts to the R gear while just rotating in the rotating direction.

On the other hand, when the shift dial 100 is rotated clockwise in the P gear or the N gear to engage a forward gear, the shift dial 100 shifts to the D gear while rotating in the rotating direction and moving downward toward the console box 500 simultaneously, and the autonomous driving dial 200 is exposed to the outside.

When the autonomous driving dial 200 is rotated clockwise in the D gear, the function set for the autonomous driving mode adds up incrementally at each clockwise rotation.

In contrast, when the autonomous driving dial 200 is rotated counterclockwise in the D gear, the function set for the autonomous driving mode is rolled back at each counterclockwise rotation.

As described above, in some implementations, the autonomous driving dial 200 is not exposed in the gears other than the D gear and is exposed in the D gear so that the autonomous driving dial 200 may be manipulated in the D gear only, thereby preventing an erroneous manipulation of the autonomous driving dial 200.

In addition, the shifting of the shift dial 100 requires a slight pressing of the shift dial 100 toward the console box 500, thereby preventing an unintended shifting and improving the safety of shifting.

Further, the integration of the shift dial 100 with the autonomous driving dial 200 that allows the selection of the autonomous driving mode removes the need for a separate manipulation device of the autonomous driving mode, thereby downsizing the shift device package to allow more freedom in the interior layout and the cost savings.

Further, various functions of the autonomous driving mode may add up or be rolled back based on the concept of (+)/(−) manipulations, thereby facilitating the selection of the autonomous driving mode as the driver desires and enhancing the manipulation convenience of the autonomous driving mode.

The present disclosure has been described in terms of the specific examples described above, but it is obvious to those skilled in the art that the present disclosure may be variously modified and altered within the scope of the technical spirit of the present disclosure, and these modifications and alterations are naturally within the scope of the claims below.

What is claimed is:

1. A shift by wire system of a vehicle, the system comprising:
a shift mechanism configured to:
move in a first direction to gear positions comprising a stop gear, a reverse gear, and a forward gear, and based on moving in a second direction different from the first direction, separate the gear positions from each other,
wherein the shift mechanism comprises a shift dial disposed at an interior structure of the vehicle and configured to rotate about a rotation axis for changing the gear positions, and
wherein the shift dial is configured to:
move along the rotation axis to thereby change an axial position of the shift dial while the shift dial is rotated for shifting the gear positions, and
move along the rotation axis toward the interior structure of the vehicle based on the shift dial being rotated from the stop gear or the reverse gear to the forward gear.

2. The system of claim 1, wherein the shift dial is further configured to:
move linearly based on the shift dial being shifted (i) between the stop gear and the forward gear or (ii) between the reverse gear and the forward gear, and
restrict a linear movement of the shift dial based on the shift dial being shifted between the stop gear and the reverse gear.

3. A shift by wire system of a vehicle, the system comprising:
a shift dial configured to shift gear positions comprising a stop gear, a reverse gear, and a forward gear; and
an autonomous driving dial configured to control an autonomous driving mode of the vehicle, the autonomous driving dial being configured to:
be covered by the shift dial based on the shift dial being disposed at the stop gear or the reverse gear, and be exposed from the shift dial based on the shift dial being disposed at the forward gear,
wherein the system is configured to:
activate the autonomous driving mode based on a rotation of the autonomous driving dial; and enable or disable a function of the autonomous driving mode based on a rotating direction of the autonomous driving dial, and wherein the autonomous driving dial comprises a lock button that is exposed to an outside of the autonomous driving dial, and wherein the shift dial is configured to:
cause the vehicle to engage with a parking (P) gear based on the shift dial being moved to the stop gear, and cause the vehicle to switch from the P gear to a neutral (N) gear based on the lock button being manipulated in a state in which the shift dial is disposed at the stop gear.

4. The system of claim 3, wherein the shift dial is configured to move along a rotation axis based on the shift dial being rotated for shifting the gear positions, and wherein the autonomous driving dial comprises a manipulation portion that is configured to be covered by or exposed from the shift dial based on the shift dial moving along the rotation axis.

5. The system of claim 4, wherein the shift dial is disposed at an interior structure of the vehicle and surrounds the manipulation portion of the autonomous driving dial, and wherein the manipulation portion of the autonomous driving dial is configured to:
be covered by the shift dial based on the shift dial being disposed at the stop gear or the reverse gear, and
be exposed from the shift dial based on a linear movement of the shift dial to the forward gear in a direction toward the interior structure.

6. The system of claim 5, further comprising a plurality of detent portions corresponding to the gear positions and configured to restrict the shift dial from moving from each of the gear positions, and wherein the shift dial is configured to be released from one of the plurality of detent portions based on the shift dial being pressed downward from the one of the gear positions toward the interior structure.

7. The system of claim 3, further comprising:
a main housing that is disposed at an interior structure of the vehicle and receives the shift dial, the shift dial being configured to rotate about a rotation axis and to move toward and away from the interior structure;
a shift dial guide device configured to guide rotation of the shift dial along a rotating path of the shift dial and to guide movement of the shift dial along a moving path of the shift dial; and
a shift dial return device configured to provide elastic force to the shift dial based on the shift dial moving linearly along the moving path.

8. The system of claim 7, wherein the shift dial guide device comprises a path guide pin disposed at the shift dial,
wherein the main housing defines a shift dial groove at a rim of the main housing, the shift dial groove receiving the path guide pin and extending in a circumferential direction of the main housing, and
wherein the path guide pin is configured to move along the shift dial groove to thereby guide the shift dial along the rotating path and the moving path.

9. The system of claim 8, further comprising a plurality of detent portions that are defined in the shift dial groove and correspond to the gear positions, the plurality of detent portions being configured to restrict the shift dial from moving from each of the gear positions,
wherein each of the plurality of detent portions is configured to receive the path guide pin and recessed from an inner surface of the shift dial groove in a direction corresponding to a return movement of the shift dial.

10. The system of claim 8, wherein the shift dial groove includes:
a first guide section that horizontally extends in a radial direction of the main housing and defines a movement path of the shift dial from the stop gear to the reverse gear; and
a second guide section that is inclined with respect to the radial direction of the main housing and defines a movement path of the shift dial from the stop gear to the forward gear.

11. The system of claim 10, wherein the stop gear is configured to be engaged based on the path guide pin being disposed at a connecting position between the first guide section and the second guide section,
wherein the reverse gear is configured to be engaged based on the path guide pin being disposed at an end position of the first guide section, and
wherein the forward gear is configured to be engaged based on the path guide pin being disposed at an end position of the second guide section.

12. The system of claim 10, wherein the gear positions further comprise:
a neutral (N) gear that is configured to be engaged based on the path guide pin being disposed at a connecting position between the first guide section and the second guide section; and
a parking (P) gear that is configured to be engaged at an end position of the first guide section,
wherein the reverse gear is configured to be engaged based on the path guide pin being disposed at a middle position of the first guide section, and
wherein the forward gear is configured to be engaged based on the path guide pin being disposed at an end position of the second guide section.

13. The system of claim 7, wherein the main housing comprises a magnet sensor, and
wherein the shift dial comprises a shift dial magnet configured to be detected by the magnet sensor to thereby indicate a position of the shift dial.

14. The system of claim 7, wherein the autonomous driving dial is surrounded by the shift dial and configured to rotate about the rotation axis, and
wherein the system further comprises:
an autonomous driving dial guide device configured to guide rotation of the autonomous driving dial along a rotating path of the autonomous driving dial; and
an autonomous driving dial return device configured to provide elastic force to the autonomous driving dial based on the autonomous driving dial rotating along the rotating path of the autonomous driving dial.

15. A shift by wire system of a vehicle, the system comprising:
a shift dial configured to shift gear positions comprising a stop gear, a reverse gear, and a forward gear;
an autonomous driving dial configured to control an autonomous driving mode of the vehicle, the autonomous driving dial being configured to:
be covered by the shift dial based on the shift dial being disposed at the stop gear or the reverse gear, and
be exposed from the shift dial based on the shift dial being disposed at the forward gear;
a main housing that is disposed at an interior structure of the vehicle and receives the shift dial, the shift dial being configured to rotate about a rotation axis and to move toward and away from the interior structure;

a shift dial guide device configured to guide rotation of the shift dial along a rotating path of the shift dial and to guide movement of the shift dial along a moving path of the shift dial; and a shift dial return device configured to provide elastic force to the shift dial based on the shift dial moving linearly along the moving path, wherein the autonomous driving dial is surrounded by the shift dial and configured to rotate about the rotation axis, wherein the system further comprises:

an autonomous driving dial guide device configured to guide rotation of the autonomous driving dial along a rotating path of the autonomous driving dial, and an autonomous driving dial return device configured to provide elastic force to the autonomous driving dial based on the autonomous driving dial rotating along the rotating path of the autonomous driving dial, wherein the autonomous driving dial guide device comprises a bullet disposed at the autonomous driving dial and configured to move in an axial direction of the main housing, wherein the main housing defines an autonomous driving dial groove at a bottom surface of the main housing, the autonomous driving dial groove extending in a circumferential direction of the main housing and being configured to receive the bullet, and wherein the bullet is configured to move along the autonomous driving dial groove to thereby guide the autonomous driving dial along the rotating path of the autonomous driving dial.

16. The system of claim 15, wherein the autonomous driving dial return device comprises a bullet return spring configured to push the autonomous driving dial and the bullet in opposite directions along the axial direction, wherein the autonomous driving dial groove is inclined with respect to the axial direction and configured to guide movement of the bullet, and wherein the autonomous driving dial groove extends downward from ends of the autonomous driving dial groove toward a center of the autonomous driving dial groove between the ends of the autonomous driving dial groove.

17. The system of claim 16, wherein the system is configured to:

enable a function of the autonomous driving mode based on the autonomous driving dial being rotated from the center toward a first end of the autonomous driving dial groove; and disable the function of the autonomous driving mode based on the autonomous driving dial being rotated from the center toward a second end of the autonomous driving dial groove.

18. The system of claim 14, wherein the main housing comprises a magnet sensor, and wherein the autonomous driving dial comprises an autonomous driving dial magnet configured to be detected by the magnet sensor to thereby indicate a position of the autonomous driving dial.

* * * * *